United States Patent [19]

Tarcici

[11] Patent Number: 5,090,399
[45] Date of Patent: Feb. 25, 1992

[54] SOLAR COOKER WITH A PARABOLIC REFLECTOR

[76] Inventor: Adnan Tarcici, 8 R. Des Bugnons, Geneva, Switzerland, 1217

[21] Appl. No.: 673,147

[22] Filed: Mar. 21, 1991

[30] Foreign Application Priority Data

Jun. 25, 1990 [CH] Switzerland ............... 2105/90

[51] Int. Cl.$^5$ ............................................. F24J 2/02
[52] U.S. Cl. ................................... 126/451; 126/438
[58] Field of Search ............... 126/451, 424, 425, 438, 126/439

[56] References Cited

U.S. PATENT DOCUMENTS

| | | | |
|---|---|---|---|
| 2,770,229 | 11/1956 | Tarcici | 126/451 |
| 2,806,134 | 9/1957 | Tarcici | 126/451 |
| 3,643,648 | 2/1972 | Tarcici | 126/451 |
| 4,112,917 | 9/1978 | Lang | 126/451 |

FOREIGN PATENT DOCUMENTS 598555  4/1978  Switzerland .................. 126/451

Primary Examiner—James C. Yeung
Attorney, Agent, or Firm—Darby & Darby

[57] ABSTRACT

Solar cooker with a fold-up parabolic reflector comprising two stacks of reflecting flexible strips (19, 20) unfoldable so as to form a reflector. Strips of each stack are connected to one another by means of a pliable band fastened to the back of each of the strips. The reflector comprises a grid (30) articulated on the end of a support (29) which can be fastened in the extension of a mount (10) by means of a simple maneuver. The grid (30) is shaped in such a way that it can be put into the position of use on its support (29) simply as a result of rotation.

2 Claims, 2 Drawing Sheets

SOLAR COOKER WITH A PARABOLIC REFLECTOR

FIELD OF THE INVENTION

The present invention relates to a solar cooker with a fold-up parabolic reflector.

PRIOR ART

Such solar cookers are known from U.S. Pat. Nos. 2,760,482, 2,770,229, 2,806,134, 3,643,648 and 3,797,476 in the Applicant's name. These solar cookers constitute a continuous development of the product which is intended to make it more efficient and more practical to use. U.S. Pat. No. 3,643,648 describes an especially elaborate embodiment comprising a mount which can be turned down into the space of a two-part housing containing two stacks of reflecting flexible strips which can be unfolded adjustably to form a parabolic reflector focusing the solar radiation on a grid fastened to a support which can likewise be turned down into the volume of the housing. In this embodiment, the strips are connected to one another by means of two pliable bands passing through the strips via slots which allow the strips to shift on the bands, this shift being liable to cause a maladjustment of the relative position of the strips. On the other hand, the support of the grid is not held vertically in a reliable way and the fastening of the grid in the horizontal position requires the tightening of a screw which also has to be slackened in order to fold up the solar cooker.

SUMMARY OF THE INVENTION

The object of the present invention is to overcome these disadvantages.

According to a main aspect of the invention, the reflecting strips of the solar cooker, which are arranged as two stacks in two compartments of one part of the housing, are connected to one another by means of a pliable band fastened to the lower face of each of the strips at a point near that side of the strips facing the other stack of strips, the upper strip of each stack being fastened to the housing, and the lower strip being equipped with grasping and catching means for fastening it to the other part of the housing, in the unfolded position, and the support of the grid is articulated on the mount and, at its base, has two parallel wings equipped with slots, through which passes a horizontal axle fixed to the mount and to a part laterally offset relative to said slots and intended for engaging vertically into the mount in the vertical position of said support, the slots of which slide on said axle, the grid being articulated on the end of the support by means of an angled part comprising an axle for pivoting on the support and a part parallel to this axle, but at a horizontal and vertical distance from this axle, such that it comes up against the support in the horizontal position of the grid, thereby maintaining the grid in this position.

As a result of these improvements, the solar cooker can be unfolded into the operational position in an instant, the only locking operation involving locking the housing in the appropriate position about its horizontal axle on the mount. The solar cooker is likewise folded up very quickly with a minimum of manipulations.

BRIEF DESCRIPTION OF THE DRAWINGS

The accompanying drawing illustrates an embodiment of the invention by way of example.

DESCRIPTION OF THE PREFERRED EMBODIMENT

Figure 1:
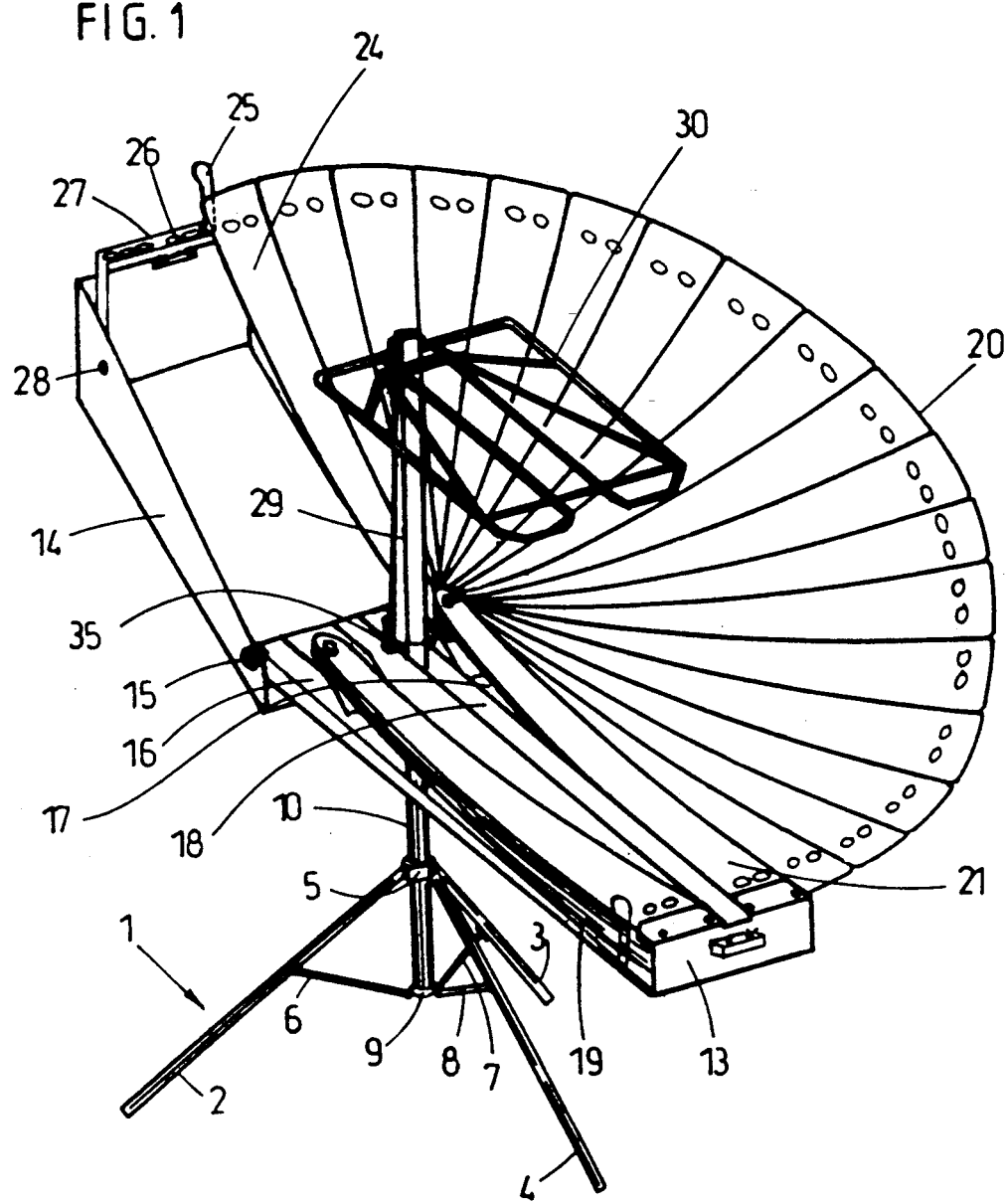
FIG. 1 shows an unfolded solar cooker with a semi-parabola unfolded.

The solar cooker illustrated in FIG. 1 comprises a mount 1 consisting of three legs 2, 3, 4, the upper ends of which are articulated on a ring 5 and an intermediate point of which is connected to a second ring 9 by means of articulated bars 6, 7, 8, the lower ring 9 supporting a vertical tube 10 mounted rotatably on the ring 9 and guided by the upper ring 5 retained on the tube 10 by means of a circlip. The vertical tube 10 is equipped, at its upper end, with a U-shaped piece 11 forming a double bracket for an axle 12 (FIG. 4), about which is articulated a first part 13 of an elongate rectangular housing consisting of the first part 13 and the second part 14 articulated at 15 on a small side of the part 13 of the housing.

Figure 2:
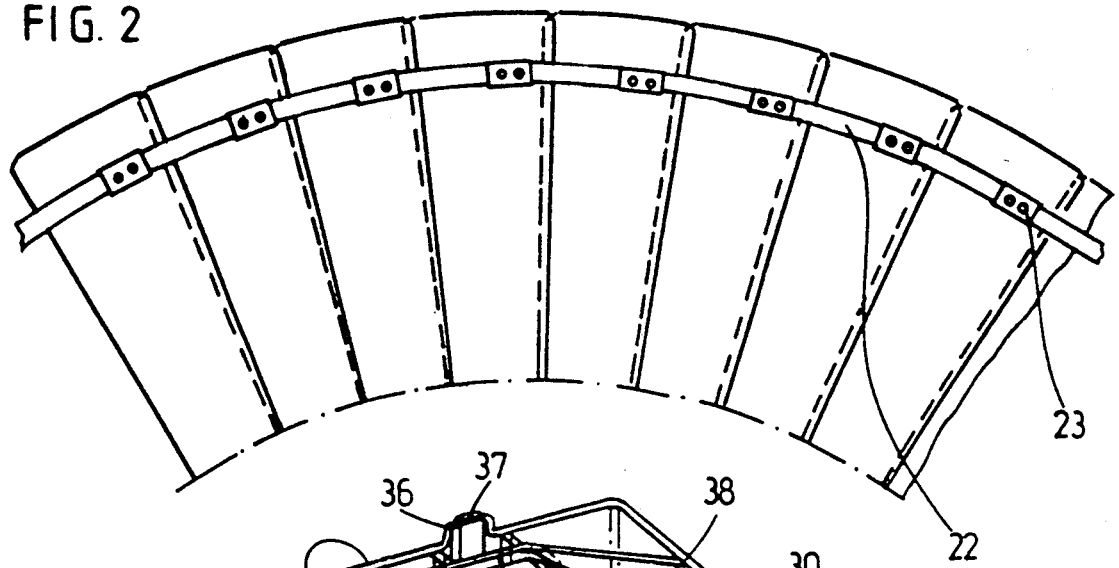
FIG. 2 is a detailed bottom view of some of the reflecting strips of a stack of strips.
Figure 3:
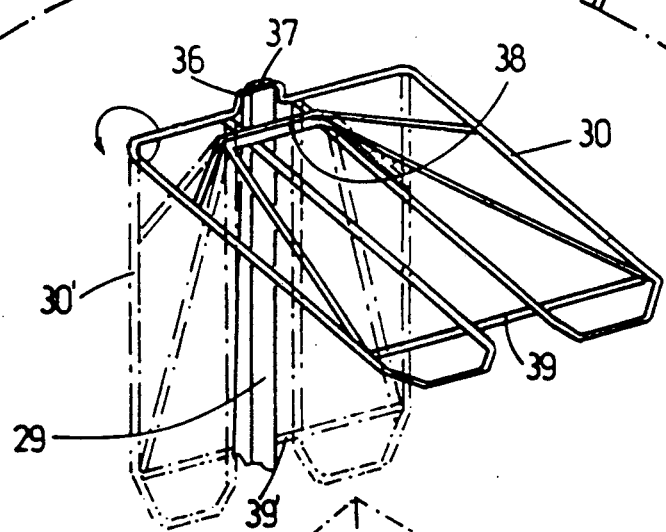
FIG. 3 is a detailed view of the grid on its support.

The first part 13 of the housing is divided into two compartments 16 and 17 extending parallel to the long side of the housing, these two compartments 16 and 17 being separated by a space 18, in which the mount 1 is accommodated in the turned-down and folded-up position. Each of the compartments 16 and 17 of the housing contains a stack of reflecting flexible strips 19 and 20, each of these stacks forming a fan, the stack 19 being shown in the folded-up position and the stack 20 in the unfolded position. The upper strip 21 of each stack is fastened permanently to the first part 13 of the housing. All the strips of a stack are connected to one another by means of a nonelastic pliable band 22 (FIG. 2) fastened under each strip at a point 23 near that side of the strip facing the middle space 18 when the strips are folded up in the form of stacks in the housing. The lower strip 24 of each stack is equipped with a grasping means 25 terminating in a tab intended, in the unfolded position of the strips, for engaging into one of the holes 26 of a stirrup 27 mounted near the end of the second part of the housing 14 opposite the point of articulation 15 so that it can be turned down about an axle 28. The row of holes 26 makes it possible to adjust the position of the focal points of the two parabolic half-reflectors formed by the two stacks of strips, as described in U.S. Pat. No. 3,643,648. Since the reflecting strips are fastened to the band 22, their unfolded position is fixed and foolproof.

Figure 4:
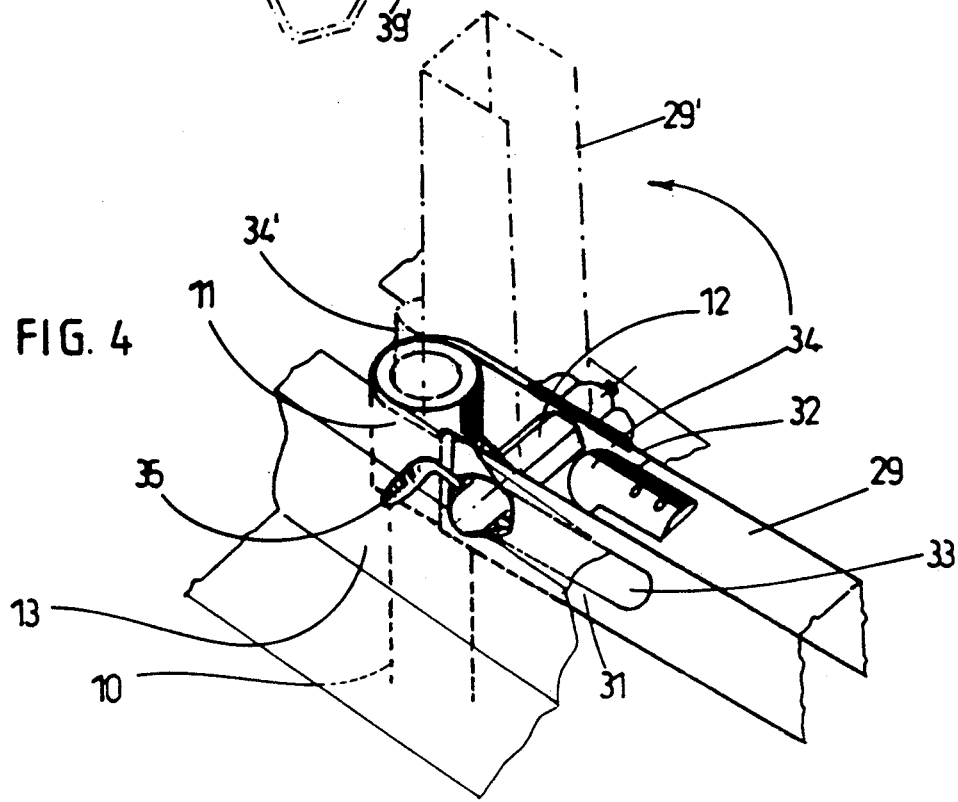
FIG. 4 is a detailed view of the articulation and fastening of the grid support on the mount of the solar cooker.

The solar cooker comprises, furthermore, a support 29 carrying a grid 30 intended for supporting a cooking utensil. The support 29 consists of a U-shaped section, the lower part of which forms two wings 31 and 32, each having a slot 33 through which the axle 12 passes. A cylindrical piece 34 is fastened to the transverse wall of the section forming the support 29. This piece 34 therefore extends between the wings 31 and 32 so as to be offset radially relative to the slots 33. In FIG. 4, the support 29, as represented by unbroken lines, is in a free position allowing it to pivot about the axle 12 for turning it down and stowing it in the space 18 of the housing. From this position, the support 29 can be pivoted in the direction of the arrow in order to bring it into a vertical position, as represented by dot-and-dash lines 29'. In this position, the cylindrical piece 34 is in axial alignment with the tube 10 of the mount, and its diameter is such that it can engage freely into the tube 10, as shown at 34'. This engagement is allowed by the slots 33. In this position, the support 29 is fastened vertically, the axle 12 and the slots 33 contributing to the firmness of this vertical fastening. To fold up the support 29, it is sufficient to pull it upwards slightly in order to free it from the tube 10 and turn it down into the housing.

The axle 12 possesses, furthermore, bearing surfaces, against which it is possible to lock the first part 13 of the housing by means of a handle 35 equipped with an eccentric forming a clamping cam. Such a device is well known per se.

The grid 30 is articulated on the end of the support 29 by means of an angled part comprising a bent part 36 forming a pivot axle mounted rotatably in a receptacle formed at the end of the support 29 by the folding up of a lip 37 and by a part 38 parallel to the axle 36, but located at some horizontal and vertical distance from this axle 36, in such a way that, in the horizontal position of the grid 30, the part 38 comes up against the support 29, thereby maintaining the grid 30 in this horizontal position. To fold up the grid, it is sufficient to pivot it in the direction of the arrow in order to bring it into the position represented by dot-and-dash lines 30'. The turning down is limited by the bar 39 of the grid 30 which comes up against the support 29. Conversely, the unfolding of the grid 30 for putting it into the operational position takes place simply as a result of the rotation of the latter in the opposite direction.

Starting from the unfolded position shown in FIG. 1, to fold up the solar cooker it is sufficient to release the fastening 25, fold up the strips into the part 13 of the housing, turn down the grid 30 rearwards, pull slightly on the support 29 and turn it down into the space 18, fold up the legs of the mount 1 and turn down this mount into this same space 18, and reclose the housing. One of the legs of the mount engages into the U-shaped section of the support 29.

The operations in reverse order are carried out just as quickly for unfolding the solar cooker and putting it into the operational position.

I claim:

1. A solar cooker with a foldable parabolic reflector, comprising:

a foldable mount having a longitudinal axis:

a generally hollow rectangular housing of extended length including a first part and a second part, said parts dividing said housing lengthwise, said housing parts being articulated to each other at a pivot axis at one end respectively of said parts, said first part being connected to said mount for rotation about said longitudinal axis of said mount and for pivoting about an axis transverse to said longitudinal axis, said first part being longitudinally divided into a first compartment and a second compartment, said compartments having a space between them, said space being dimensioned to receive said mount in a folded condition of said mount;

a first stack and a second stack of reflecting strips, each said stack being located in a respective one of said compartments, the strips in each said stack being connected to each other at one end by a common pivot for reversible unfolding of said strips about said pivot to form a portion of a parabolic reflector, the reflector portions produced by each said stack together forming a parabolic reflector, the pivoted strip ends being proximate said mount, the other ends of said strips of each said stack being connected each to the adjacent strip by a pliable band, a first strip of each said stack being fixed to said housing and a last strip of each said stack having means for connection to said second part when said reflector is unfolded;

adjustable means for connection of said last said strips to said second part, said adjustable means being fastened to said second part of the housing at the end of said second part away from said mount;

a support having at one end a bracket including two wings extending in parallel, said wings having parallel slots, said support having an engagement member attached between said wings for engaging said mount when said support is unfolded, in use, relative to said mount;

an axle passing through said slots with sliding and pivoting engagement, said support being articulated relative to said mount by said axle;

a grid for supporting a utensil to be heated at the focal point of the reflector, said grid being pivotably connected to said support at the end of said support away from said axle by a first member extended along a grid axis and a second member of said grid parallel to said grid axis and said axle, said second member abutting said support when said support and grid are positioned for operation of said reflector, said grid being maintained in position by said second member.

2. A solar cooker as in claim 1, wherein said mount includes a rotatable tube aligned to said longitudinal axis, said bracket being fixed to said tube, said first housing part being mounted to said axle for said transverse pivoting of said housing, and said first housing being pivotable about said longitudinal axis by rotation of said tube, and further comprising means for releasably locking said housing for rotation on said axle.

* * * * *